United States Patent
Akiyama et al.

(10) Patent No.: US 6,937,917 B2
(45) Date of Patent: Aug. 30, 2005

(54) SUBSTRATE PROCESSING APPARATUS, OPERATION METHOD THEREOF AND PROGRAM

(75) Inventors: Kazuya Akiyama, Kyoto (JP); Toru Azuma, Kyoto (JP); Yasufumi Koyama, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 90 days.

(21) Appl. No.: 10/726,920

(22) Filed: Dec. 2, 2003

(65) Prior Publication Data

US 2004/0122545 A1 Jun. 24, 2004

(30) Foreign Application Priority Data

Dec. 19, 2002 (JP) ........................... 2002-368415

(51) Int. Cl.$^7$ .................... G06F 19/00; H01L 21/02
(52) U.S. Cl. .................. 700/121; 700/117; 438/5
(58) Field of Search ..................... 700/90, 95, 117, 700/121; 438/5; 257/E21.002

(56) References Cited

U.S. PATENT DOCUMENTS

| | | | | |
|---|---|---|---|---|
| 6,134,482 A | * | 10/2000 | Iwasaki | 700/121 |
| 6,275,740 B1 | * | 8/2001 | Smith et al. | 700/108 |
| 6,292,708 B1 | * | 9/2001 | Allen et al. | 700/121 |
| 6,801,827 B2 | * | 10/2004 | Yoshitake et al. | 700/121 |
| 2003/0023340 A1 | * | 1/2003 | Kitamoto et al. | 700/121 |
| 2003/0033046 A1 | * | 2/2003 | Yoshitake et al. | 700/121 |
| 2003/0171837 A1 | * | 9/2003 | Yamazaki et al. | 700/121 |

FOREIGN PATENT DOCUMENTS

JP        10-322906        4/1998

OTHER PUBLICATIONS

English translation of Abstract for Japanese Patent Application Laid-Open No. 10-322906 dated Apr. 12, 1998.

* cited by examiner

*Primary Examiner*—Jayprakash N. Gandhi
(74) *Attorney, Agent, or Firm*—Ostrolenk, Faber, Gerb & Soffen, LLP

(57) ABSTRACT

Provided is a substrate processing apparatus that can reduce power consumption, while maintaining throughput. In addition to a normal mode in which all units are activated, the apparatus is provided with an energy saving mode that is selectable. When the energy saving mode is selected, only essential units that are requisites for a substrate processing are activated and used in the substrate processing. If it is necessary to increase process efficiency, any additional unit may be activated and used in the processing. During standby, only an essential unit can be activated and the rest is halted, or alternatively, all units may be halted. The transition to the energy saving mode can occur when the standby state continues for a predetermined period of time after the normal mode is selected.

19 Claims, 7 Drawing Sheets

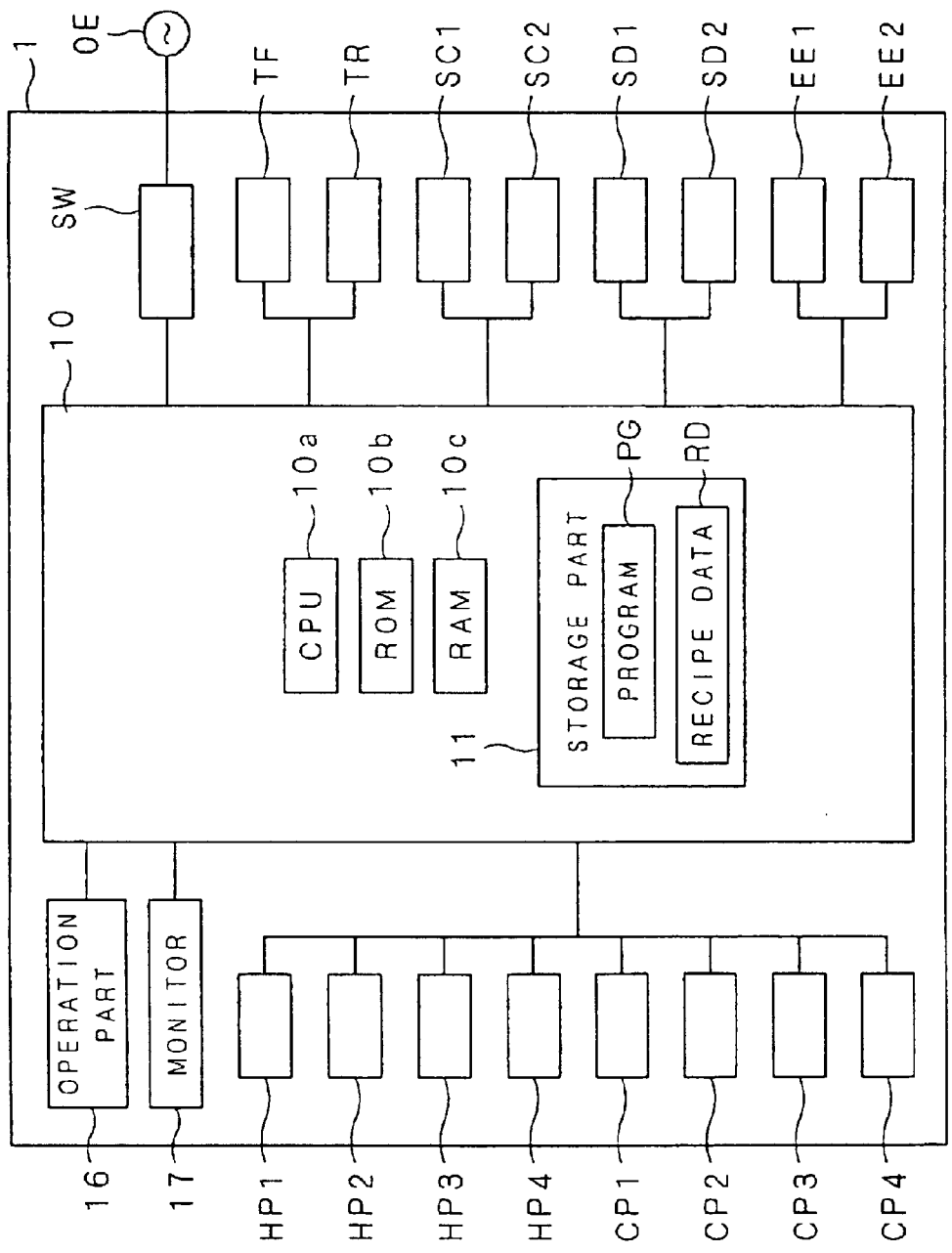
F I G . 3

SUBSTRATE PROCESSING APPARATUS, OPERATION METHOD THEREOF AND PROGRAM

BACKGROUND OF THE INVENTION

1. Field of the Invention

The present invention relates to a technique of reducing energy consumption in a substrate processing apparatus.

2. Description of the Background Art

In the manufacturing steps of semiconductor devices, liquid crystal devices and the like, substrate processing apparatuses performing a variety of processes to semiconductor substrates and glass substrates meet the manufacturers' requirements of improving throughput by multi-unit arrangement that a plurality of process units serve one processing step, and by compounding of disposing adjacent each other process units of different types in order to continuously perform different processing steps in a single apparatus.

As such multi-unit arrangement and compounding are advanced, the power necessary for operating a substrate processing apparatus tends to increase. Especially more power is required at the time of start-up than during steady state. Therefore, one heretofore known technique of reducing the power consumption at the time of start-up is disclosed, for example, in Japanese Patent Application Laid-Open No. 10-322906.

However, when the power source of a substrate processing apparatus is turned off and thereafter turned on, in general, it takes long to stabilize the operation state of the apparatus. Therefore, in order to start processing as quickly as possible for the required time, the power source often remains turned on even when performing no processing. This is because the operation state is more likely to be stabilized than when frequently turning on and off the power source. As a result, there is no significant difference between the power consumption at low operating rates and that at high operating rates, thereby contributing to maintenance and power supply cost rises.

SUMMARY OF THE INVENTION

The present invention is directed to the control of the activation and halt of individual processing elements of a substrate processing apparatus. According to the present invention, a substrate processing apparatus includes: (a) at least one processing part each having a plurality of processing elements, processing types of which are the same in each of the at least one processing part; (b) a control element for controlling the operation of the plurality of processing elements, wherein activation and halt of the processing elements are controlled independently; and (c) a storage element for storing data related to operation conditions of the processing elements. The substrate processing apparatus is not only capable of executing a predetermined substrate processing with all of the plurality of processing elements but also capable of executing the predetermined substrate processing with only part of the plurality of processing elements.

This enables to perform processing by activating a minimum required number of process units, thereby suppressing more power consumption in the substrate processing apparatus than has hitherto been possible.

Preferably, the storage element stores information for specifying at least one first processing element among the plurality of processing elements. The at least one first processing element is previously selected to be activated preferentially in the substrate processing apparatus. The control element activates the at least one first processing element when no processing elements has been activated for execution of the predetermined substrate processing.

Thus, process units essential to a predetermined processing are previously selected. This avoids such a state that unnecessary process units remain activated, thereby suppressing power consumption. In addition, since only the minimum required process units for a predetermined process are activated, the power consumption can be suppressed not only during the execution of the process but also during wait state.

More preferably, the substrate processing apparatus further includes (d) a selecting element for an operator to select an operation mode from a first mode and a second mode. The first mode is an operation mode in which only the at least one first processing element among the plurality of processing elements is activated at the execution of the predetermined substrate processing. The second mode is an operation mode that in which all processing elements are activated at the execution of the predetermined substrate processing. The control element activates one or more processing elements in accordance with the operation mode selected.

Thus, a process unit is activated in accordance with required process efficiency, so that a reduction in power consumption is compatible with a high throughput performance in a single apparatus.

It is therefore an object of the present invention to provide a substrate processing apparatus that can reduce power consumption, while maintaining throughput.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram of a control system in this substrate processing apparatus;

DESCRIPTION OF THE PREFERRED EMBODIMENTS

First Preferred Embodiment

<Overall Configuration>

Figure 1:
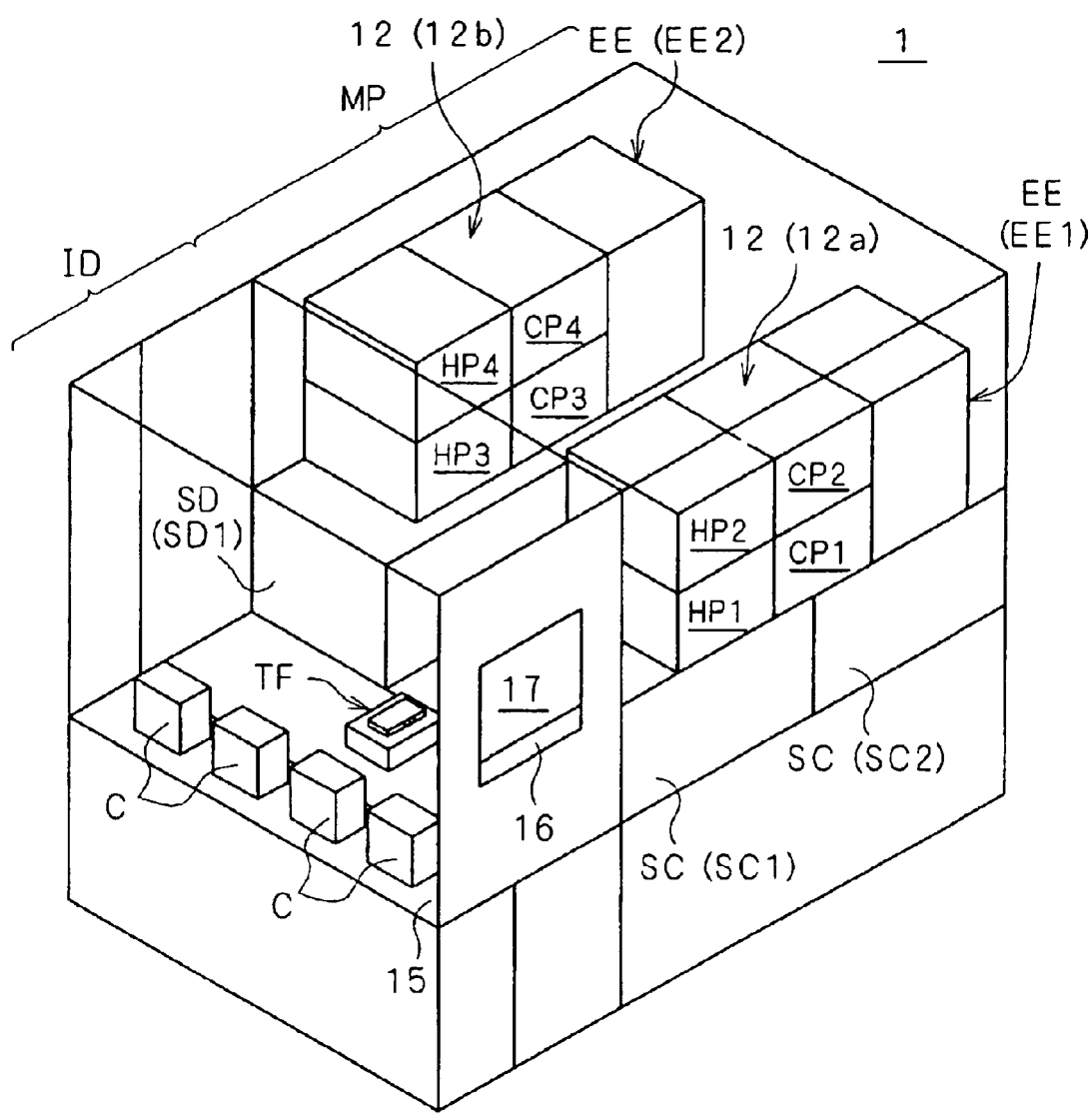
FIG. 1 is a perspective view showing the outline of the entire substrate processing apparatus of the present invention.
Figure 2:
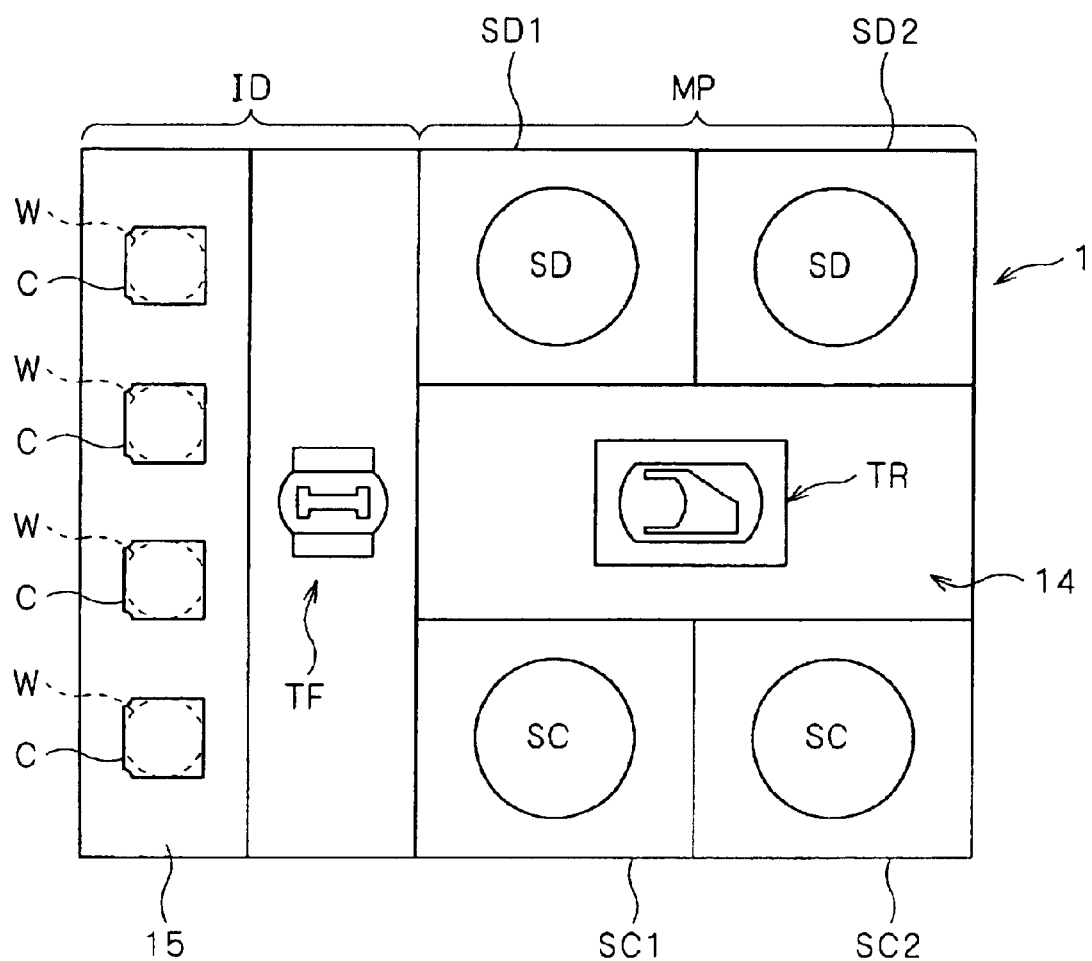
FIG. 2 is a plan view showing the schematic configuration of this substrate processing apparatus.

FIG. 1 is a perspective view showing the outline of the entire substrate processing apparatus 1 according to a first preferred embodiment of the present invention. FIG. 2 is a plan view showing the schematic configuration of the substrate processing apparatus 1. This apparatus 1 is a substrate processing apparatus that performs resist application process and development process to a substrate W (i.e., so-called coater and developer), which comprises mainly an indexer ID and a unit arrangement part MP.

The indexer ID is provided with a transfer robot TF and a mount stage 15. Four carriers C can be horizontally arranged and mounted on the mount stage 15. A multi-stage receiving grooves are provided in each carrier C, so that a single substrate W is stored in its horizontal position (with its main surface oriented along a horizontal plane) in each groove. Accordingly, each carrier C can store a plurality of substrates W (e.g., 25 substrates) in their horizontal position and in the state in which they are stacked in multi-stage and at predetermined spaced intervals.

The transfer robot TF has a transfer arm and can cause the transfer arm to lift and lower in a height direction, and rotate, as well as to advance and retreat in a horizontal direction. In addition, the transfer robot TF itself can move along the direction of arrangement of the carriers C, so that the transfer arm is moved horizontally along the direction of arrangement of the carriers C. That is, the transfer robot TF can move the transfer arm in three-dimension.

By these operations of the transfer robot TF, the indexer ID can unload an unprocessed substrate W from the carriers C that can store a plurality of substrates W, and then transfer it to the unit arrangement part MP, and also receive a processed substrate W from the unit arrangement part MP and then store it in the carrier C.

A plurality of process units performing a predetermined process to a substrate W are aligned in two rows in the unit arrangement part MP. These process units of the unit arrangement part MP constitute one processing part by the same type unit performing the same process.

Two coating process units SC (SC1, SC2) constituting a coating process part are aligned on the front side row in the unit arrangement part MP, as viewed in FIG. 1. The coating process units SC are so-called spin coaters that perform a uniform resist coating by dropping a predetermined amount of photoresist on the main surface of a substrate W by a resist discharge mechanism (not shown), while rotating the substrate W by a rotary mechanism (not shown).

Two development process units SD (SD1, SD2) constituting a development processing part are aligned on the rear side row in the unit arrangement part MP, as viewed in FIG. 1, and located at the same height position as the coating process units SC. The development process units SD are so-called spin developers that perform a development process by supplying a predetermined amount of developing fluid on the substrate W by supply mechanism (not shown) after being subjected to exposure, while rotating the substrate W with the rotary mechanism (not shown). The coating process units SC and development process units SD are disposed in face-to-face arrangement with a transport path 14 interposed therebetween.

Thermal treatment unit groups 11 (11a, 11b) are disposed with a fan filter unit (not shown) interposed therebetween, above the two coating process units SC and the two development units SD, respectively. For the convenience of illustration, the thermal treatment unit groups 11 and edge exposure units EE to be described hereinafter are omitted in FIG. 2. The thermal treatment unit groups 11 incorporate so-called hot plates HP (HP1 to HP4) that constitute a heating processing part for heating a substrate W to a predetermined temperature, and so-called cool plates CP (CP1 to CP4) that constitute a cooling processing part for cooling a substrate W to a predetermined temperature and also maintain the substrate W at this predetermined temperature. In the example shown in FIG. 1, the two hot plates HP1 and HP2 and the two cool plates CP1 and CP2 are arranged as the thermal treatment unit group 11a on the front side, and the two hot plates HP3 and HP4 and the two cool plates CP3 and CP4 are arranged as the thermal treatment unit group 11b on the rear side. Some of the hot plates HP unit group 11b may function as an adhesion unit performing adhesion process to a substrate W before being subjected to resist coating process and a post-exposure-bake unit, which performs baking process to the substrate after being subjected to exposure.

As shown in FIG. 1, two edge exposure units EE (EE1, EE2) are disposed adjacent to the thermal treatment unit groups 11, which constitute an edge exposure processing part and detect edge portions of a substrate W and then perform edge exposure process. The edge exposure units EE are provided to perform exposure of the peripheral region of a substrate W to which resist is already coated. The edge exposure units EE comprises mainly a rotary mechanism to rotate a substrate W, a light source for exposure that is housed in a predetermined lamp house, and an exposure shutter that is free to open and close and allows for selective irradiation of the light from the light source onto a substrate W (all of which are not shown). The edge exposure units EE expose resist at the peripheral part by irradiating the light to the edge part of a substrate W, while rotating the substrate W. The resist applied to the exposed region would be removed during development.

A transport robot TR is placed on a transport path 14 interposed between the coating process units SC and the development process units SD. The transport robot TR has two transport arms and can vertically elevate and lower the transport arms, rotate them within a horizontal plane, and advance and move them with the horizontal plane. Thus, the transport robot TR can circularly transport substrates W, according to a predetermined procedure, between the process units arranged in the unit arrangement part MP, while transferring the substrates W with respect to the transfer robot TF of the indexer ID. The transport robot TR also functions to transport a substrate W after being subjected to resist coating to the edge exposure units EE, and receive the substrate W after being subjected to exposure from the edge exposure units EE and then transport it to a predetermined position.

An operation part 16 at which an operator operates, and a monitor 17 on which an operation guidance, process menu, operation state and the like are displayed, are disposed on a side surface of the substrate processing apparatus 1.

FIG. 3 is a block diagram of a control system of the substrate processing apparatus 1 in the first preferred embodiment. The substrate processing apparatus 1 is provided with a controller 10 and a switch part SW, which are not shown in FIGS. 1 and 2. The activation/halt of the entire substrate processing apparatus 1 can be executed by changing the on/off for energization in the switch part SW. The controller 10 controls the activation and halt of each unit in the apparatus. The substrate processing apparatus 1 executes coating, development, exposure and the like, under the control of the controller 10. Preferably, the switch part SW is provided with the function of breaker that prevents excess current from flowing in the substrate processing apparatus 1.

The controller 10 comprises mainly a CPU 10a performing arithmetic processing, ROM 10b, and RAM 10c, and a storage part 11 made up of a hard disk and the like. The storage part 11 stores mainly a program PG for controlling the substrate processing apparatus 1, and a recipe data RD describing concrete control conditions. The operation of the substrate processing apparatus 1 is controlled by a variety of control means implemented by the operations of the CPU 10a, ROM 10b, RAM 10c and the like, which are caused by the execution of the program PG. The program PG may be stored in the ROM 10b.

Figure 4:
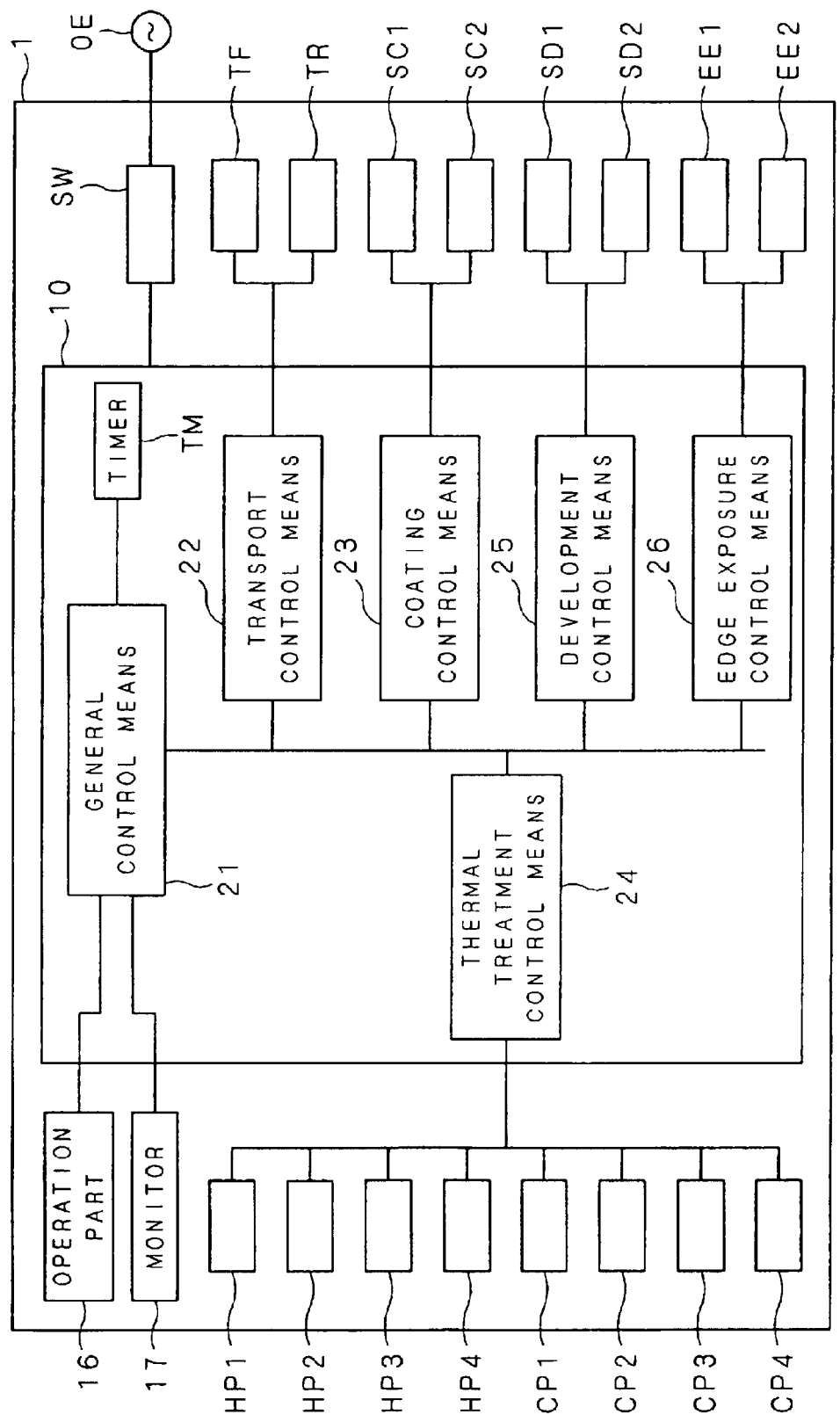
FIG. 4 is a diagram showing individual parts that are implemented on a controller by the execution of a program.

FIG. 4 is a diagram showing individual parts that are implemented on the controller 10 by the execution of the program PG. When the program PG is executed, the CPU 10a, ROM 10b, RAM 10c and the like implement, on the controller 10, a general control means 21, transport control means 22, coating control means 23, thermal treatment control means 24, development control means 25, edge exposure control means 26, and a timer TM.

The general control means 21 reads the contents described in the recipe data RD and performs the operational control of the entire substrate processing apparatus 1, such as the settings of control contents to be performed in the individual control means which will be described later, the management of the operation states in the individual parts, the operation control in the operation part 16, and the display control in the monitor 17.

The transport control means 22 performs the operational control of the transfer robot TF and transport robot TR. Specifically, the operations related to the unloading and delivery of a substrate W with respect to the carriers C, the transfer of a substrate W between the transfer robot TF and transport robot TR, the transfer of a substrate W between the transport robot TR and each process unit, are executed under the control of the transport control means 22.

The coating control means 23 controls the operations of the two coating process units SC (SC1, SC2) that correspond to the coating processing part. For example, the coating control means 23 controls the on/off operations of the coating process units SC, the operations of a substrate rotational mechanism and resist discharge mechanism (not shown), which are disposed in the coating process units SC, respectively, the flow rate and temperature of resist, the temperature and humidity within the units, and the like. Since the two coating process units SC are controlled independently by the coating control means 23, the coating process units SC1 and SC2 can process different substrates W concurrently and in parallel (this manner is hereinafter referred to as a "concurrent processing"). In addition, when an energy saving mode to be described later is selected, only one of the coating process units SC1 and SC2 can be operated to perform processing (this manner is hereinafter referred to as a "selective processing").

The thermal treatment control means 24 controls the operations of four hot plates HP (HP1 to HP4) that correspond to the heating processing part, and four cool plates CP (CP1 to CP4) that correspond to the cooling processing part. For example, the thermal treatment control means 24 performs the on/off operations of the hot plates HP and cool plates CP, and feedback control necessary for achieving a predetermined holding temperature in the hot plates HP and cool plates CP, respectively. The hot plates HP and cool plates CP are controlled independently by the thermal treatment control means 24. Therefore, concurrent processing and selective processing are also executable in the hot plates HP and cool plates CP. In this case, any number of the four hot plates HP and four cool plates CP are selected as a selective processing object.

The development control means 25 controls the operations of two development process units SD (SD1, SD2) that correspond to the development processing part. For example, the development control means 25 controls the on/off operations of the development process units SD, the operations of a substrate rotational mechanism and developing fluid discharge mechanism (not shown) which are provided in the development process units SD, the flow rate and temperature of developing fluid, and the temperature and humidity within the units. The two development process units SD are controlled independently by the development control means 24. Therefore, concurrent processing and selective processing are also executable in the development process units SD.

The edge exposure control means 26 controls the operations of two edge exposure units EE (EE1, EE2) that correspond to the edge exposure processing part. For example, the edge exposure control means 26 controls the on/off operations of the edge exposure units EE, the operations of a substrate rotational mechanism (not shown) which is provided in each of the edge exposure units EE, the light-up and light-out of a light source for exposure, and the quantity of light of the light source, the opening/closing of an exposure shutter. The two edge exposure units EE are controlled independently by the edge exposure control means 26. That is, concurrent processing and selective processing are also executable in the edge exposure units EE.

The timer TM is an internal timer to provide time that is used as the basis for control of each control means.

The operation of each part of the substrate processing apparatus 1 is implemented by each control means of the controller 10 that controls the corresponding part in accordance with the contents of setting and the contents of processing that are described in the recipe data RD stored in the storage part 11.

<Process Operation>

Figure 5:
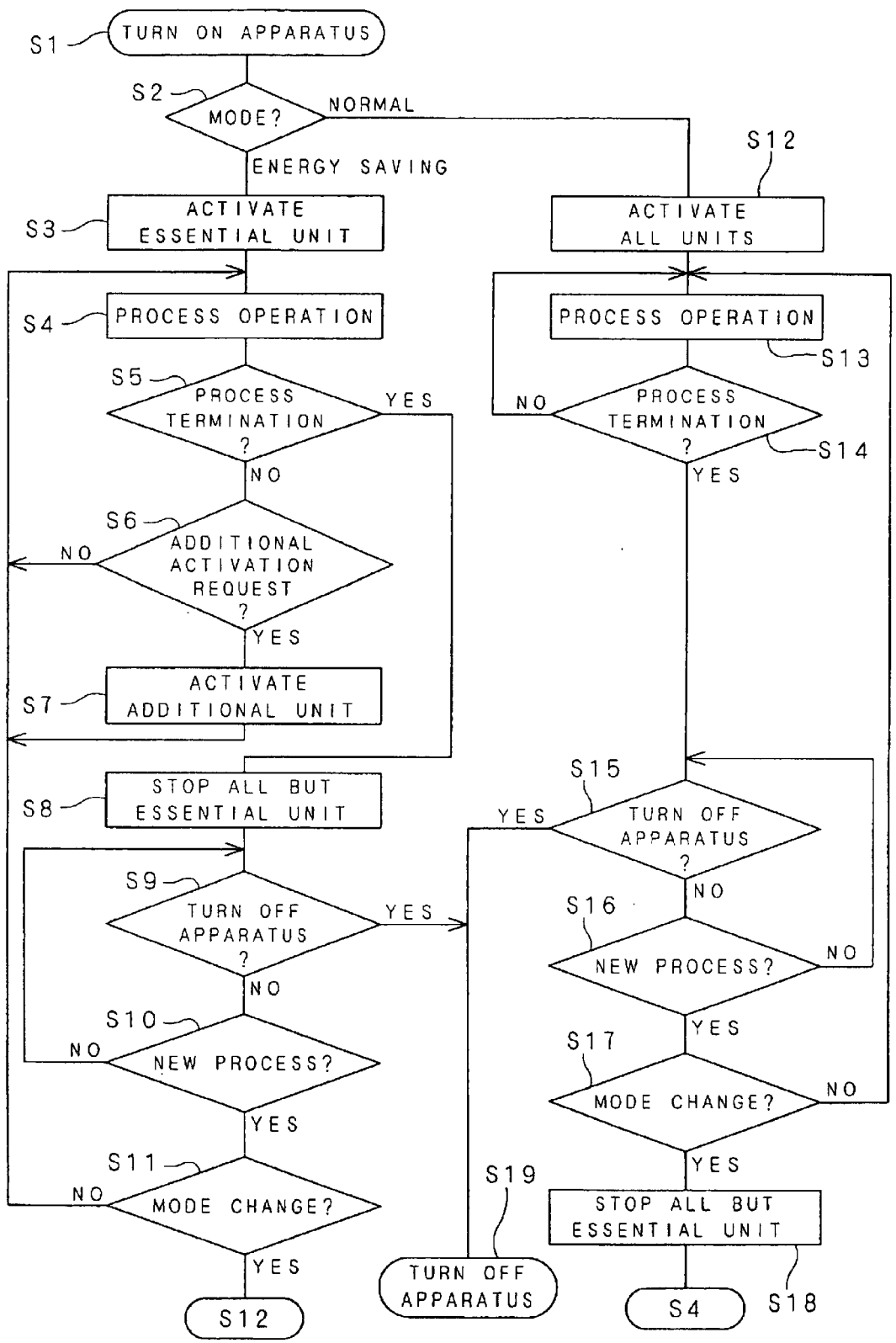
FIG. 5 is a diagram showing the flow of operation in a substrate processing apparatus according to a first preferred embodiment of the present invention.

The following is the contents of operations mainly related to energy saving in the substrate processing apparatus 1. FIG. 5 is a diagram showing the flow of operations in the substrate processing apparatus 1 of the first preferred embodiment.

First, a predetermined operation to the switch part SW of the substrate processing apparatus 1 brings the entire substrate processing apparatus 1 into electrical continuity state (step S1). Then, as required, a recipe data is written and an operation mode is selected (step S2). At this point, the operator of the substrate processing apparatus 1 selects as to whether the succeeding process is to be executed by "energy saving mode" or "normal mode." The term "energy saving mode" implies a mode in which as a general rule, from all the process units, only a minimum number of process units essential to the processes described in the recipe data (hereinafter referred to as "essential unit(s)") are activated to perform the processes only by the essential units and, if required depending on the process circumstances, one or more other process units (hereinafter referred to as "additional unit(s)") are activated. On the other hand, the term "normal mode" implies a mode in which all the process units are activated to perform the processes.

Description will now be made of the case that the energy saving mode is selected in step S2. In this case, the general control means 21 instructs each control means to activate only the essential unit among process units, and each control means responds to this and activates only the essential unit (step S3). Here, an operator can determine at will as to which process unit is to be set as the essential unit, but at least one process unit per processing part must be selected. The operator may make its determination by operating the operation part 16, or alternatively, by selecting one of some setting patterns about essential units previously stored in the storage part 11. By way of example and without limitation, the following is the case that the coating process unit SC1, development process unit SD1, edge exposure unit EE1, hot plates HP1 and HP2, and cool plates CP1 and CP2 are set as essential units in the substrate processing apparatus 1.

In the present specification, the term "activation" of a process unit implies an operation of bringing about a predetermined operation condition described in a recipe data to the process unit. Any process unit that is not the object of "activation" may be maintained in a minimum electrical continuity state (standby state), although the operation condition is not brought about. In this case, the term "halt" is not limited to imperfect electrical continuity state, but includes the case of transiting from the "activation" state in which a process is executable, to the standby state. Examples of the standby state are to maintain the hot plate HP in its preheating state and to perform only lighting-out of a light source for exposure in the edge exposure unit EE.

When the essential units are activated and all of them reach the state satisfying their respective service conditions described in the recipe data, each control means sends the general control means 21 a signal indicating that the essential units are in their ready condition. When all the essential units reach their ready condition, a substrate processing is executable and, based on the contents of the recipe data, a sequence of process operations are executed to substrates W (step S4). Specifically, the resist coating process in the coating process unit SC1, the edge exposure process in the edge exposure unit EE1, and the development process in the development process unit SD1 are performed continuously with respect to a plurality of substrates W taken out of the carrier C, while performing, between the above-mentioned processes, thermal processes in the hot plates HP1, HP2, and the cool plates CP1, CP2. During these processes, the transport robot TR is controlled by the general control means 21 and transport control means 22 such that it transports the substrates W only to the operating essential units. In this case, only a minimum required number of process units for performing the processes are activated to execute the processes, thereby suppressing power consumption.

During the execution of the processes with respect to the plurality of substrates W ("NO" in step S5), the general control means 21 always monitors the presence and absence of an activation request of any additional unit from an operator, which is hereinafter referred to as "additional activation request," (step S6). In the case that the energy saving mode is selected and only the essential units perform processing, for example, when the operator judges that production efficiency is poor only with the essential units, or when it is desired to perform a certain process ahead of schedule, the operator can present an additional activation request to request the activation of one or more additional units that are not activated at that time, by performing a predetermined operation through the operation part 16. It is of course possible to continue the processes only with the essential units ("NO" in step S6).

When the additional activation request is presented ("YES" in step S6), the general control means 21, in response to the request, causes the control means to activate the additional unit that is their respective control object (step S7). Thereafter, when a signal indicating that the additional unit reaches its ready condition is sent from the individual control means, the general control means 21 and transport control means 22 incorporate the additional unit into the transport destination, so that the process operations to the substrates W are continued with all the operating process units.

It should be noted that an operator can set any additional unit at will and it is not necessary to set as additional units all the process units which were not set as essential units. For example, an operator may make its determination by previously operating the operation part 16, or the operator may select one of some setting patterns about additional units previously stored in the storage part 11. For example, in the case that the essential units are set as described above, only the edge exposure unit EE2 may be selected as an additional unit, or alternatively, the hot plate HP3 and cool plate CP3 may be added thereto to set the additional unit, but without limiting to such selections.

When the scheduled sequence of processes is completed ("YES" in step S5), the substrate processing apparatus 1 is placed in the wait state until the next process request occurs. A process request may be provided by the operator's operation of the operation part 16. In automatic transportation of the carrier C, a process request may be provided automatically to the timing of the carrier C transportation. In any case, if the processes are executed with simultaneous use of one or more additional units, the general control means 21 instructs the individual control means to halt the additional units (step S8), so that only the essential units are activated until a new process is performed ("NO" in step S9, "NO" in step S10). This suppresses the power consumption of the substrate processing apparatus 1 in the wait state. When it is obvious that other process will be performed immediately thereafter, it may be configured so as to maintain the additional units active, if necessary.

After placed in the wait state for some time, if the execution of a new process is triggered by the arrival of other process lot or the like ("YES" in step S10), prior to the process, a mode change is possible, if necessary (step S11). If no mode change is needed ("NO" in step S11), returning to step S4, the energy saving mode is continued to perform processing with respect to a new substrate W. When the energy saving mode is changed to the normal mode ("YES" in step S11), moving to step S12, the processing will be performed in the normal mode to be described later.

If the substrate processing apparatus 1 is not used thereafter for some time ("YES" in step S9), the power source can be turned off (step S19).

The following is the operation when the normal mode is selected in step S2. The operation in the normal mode is the same as that in the conventional substrate processing apparatus. When there are a large number of process lots and high process efficiency is required, it is desirable to perform processes in the normal mode. In this case, the general control means 21 instructs the individual control means to activate all the process units, and the individual control means, in response to this, activate the process units (step S12). If a mode change occurs in step S11, the process units other than the essential units are to be activated.

When the individual process units are brought into their usable state ("NO" in step S14), a predetermined process operation is executed (step S13).

At the completion of the scheduled sequence of processes ("YES" in step S14), the substrate processing apparatus 1 is placed in the wait state until the next process request. In the normal mode, all the process units are activated, until a new process is performed ("NO" in step S15, "NO" in step S16). In this case, the power consumption of the substrate processing apparatus 1 cannot be suppressed in the wait state. However, the total power consumption may be suppressed in consideration of the power consumption necessary for restarting the process units once halted. Therefore, it is preferable to select the optimum mode in relation to process efficiency.

After placed in the wait state for some time, if the execution of a new process is triggered by the arrival of other process lot or the like ("YES" in step S16), also in the normal mode, prior to the process, a mode change is possible, if necessary (step S17). If no mode change is needed ("NO" in step S17), returning to step S12, the normal mode is continued to perform processing with respect to a new substrate W. When the normal mode is changed to the energy saving mode ("YES" in step S17), the general control means 21 maintains only the essential units in their active state and halts the rest process units (step S18). Then, moving to step S4, the process is executed in the above-mentioned energy saving mode.

In the case that after the operation in the normal mode, the substrate processing apparatus 1 is not used for some time ("YES" in step S15), the power source can be turned off (step S19).

As discussed above, in accordance with the first preferred embodiment, the substrate processing apparatus 1 is provided with the energy saving mode. This permits selection between the manner in which depending on the required throughput, only the minimum required number of process units are activated to execute processes, and the manner in which all the process units are activated to obtain the maximum process efficiency and execute processing. Additionally, when performing no processes, the substrate processing apparatus can be placed in the wait state, while activating only the minimum required process units. This suppresses more power consumption in the substrate processing apparatus than has hitherto been possible.

Second Preferred Embodiment

The processing manner in the substrate processing apparatus is not limited to that described in the first preferred embodiment. The following is a manner with which it is possible to further suppress the power consumption in the normal mode of the first preferred embodiment. Since a substrate processing apparatus 1 of a second preferred embodiment has basically the same configuration as the first preferred embodiment, its description is omitted herein.

Figure 6:
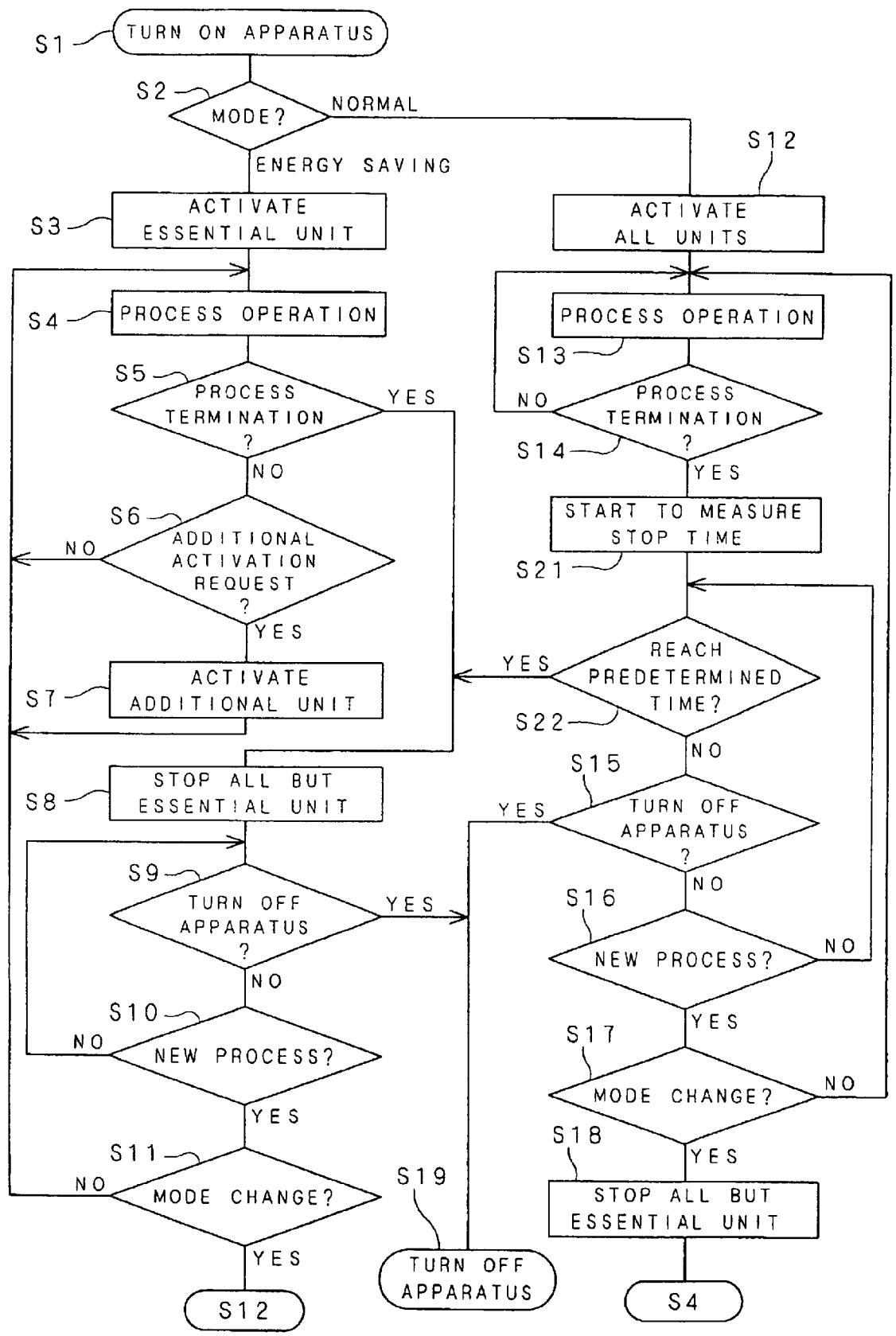
FIG. 6 is a diagram showing the flow of operation in a substrate processing apparatus according to a second preferred embodiment of the present invention.

FIG. 6 is a diagram showing the flow of operation in the substrate processing apparatus 1 according to the second preferred embodiment. The flow of FIG. 6 is the same as that of FIG. 5, except for the point that when the normal mode is selected, steps S21 and step S22 are added. The operations other than that irrelevant to this point, such as the operations in the energy saving mode, are basically the same as that in the first preferred embodiment. Therefore, similar reference numerals are used, and their description is omitted herein.

In the second preferred embodiment, when the normal mode is selected in step S2, and thereafter a predetermined process is terminated ("YES" in step S12, step S13 and step S14), a general control means 21 measures, on the basis of a timer TM, the elapsed time since each of the process units except for those set as essential units terminated its latest operation (step S21). Then, it is monitored whether a preset threshold time elapses or not (step S22). When the threshold time elapses ("YES" in step S22), moving to step S8, the process units except for the essential units are halted. That is, in the second preferred embodiment, if the substrate processing apparatus 1 in the wait state is not used for a predetermined period of time after executing processes in the normal mode, the transition from the normal mode to the energy saving mode occurs automatically and the substrate processing apparatus 1 waits for a new process request in the wait state in the energy saving mode.

An operator can set the threshold time at will through the operation part 16. In an alternative, the threshold time may be set separately per process unit for stepwise transition from the normal mode to the energy saving mode.

Thus, in the second preferred embodiment the transition from the normal mode to the energy saving mode occurs when the wait state in the normal mode continues for a predetermined period of time. This permits a reduction in power consumption of the substrate processing apparatus, while lowering the burden of monitoring with respect to the operating conditions of the apparatus. As a result, the power consumption can be further suppressed than the first preferred embodiment.

Third Preferred Embodiment

The following is a manner with which it is possible to further suppress the power consumption in the energy saving mode in the second preferred embodiment. Also in a third preferred embodiment, the configuration of a substrate processing apparatus 1 is basically the same as that of the foregoing embodiment, and its description is omitted herein.

Figure 7:
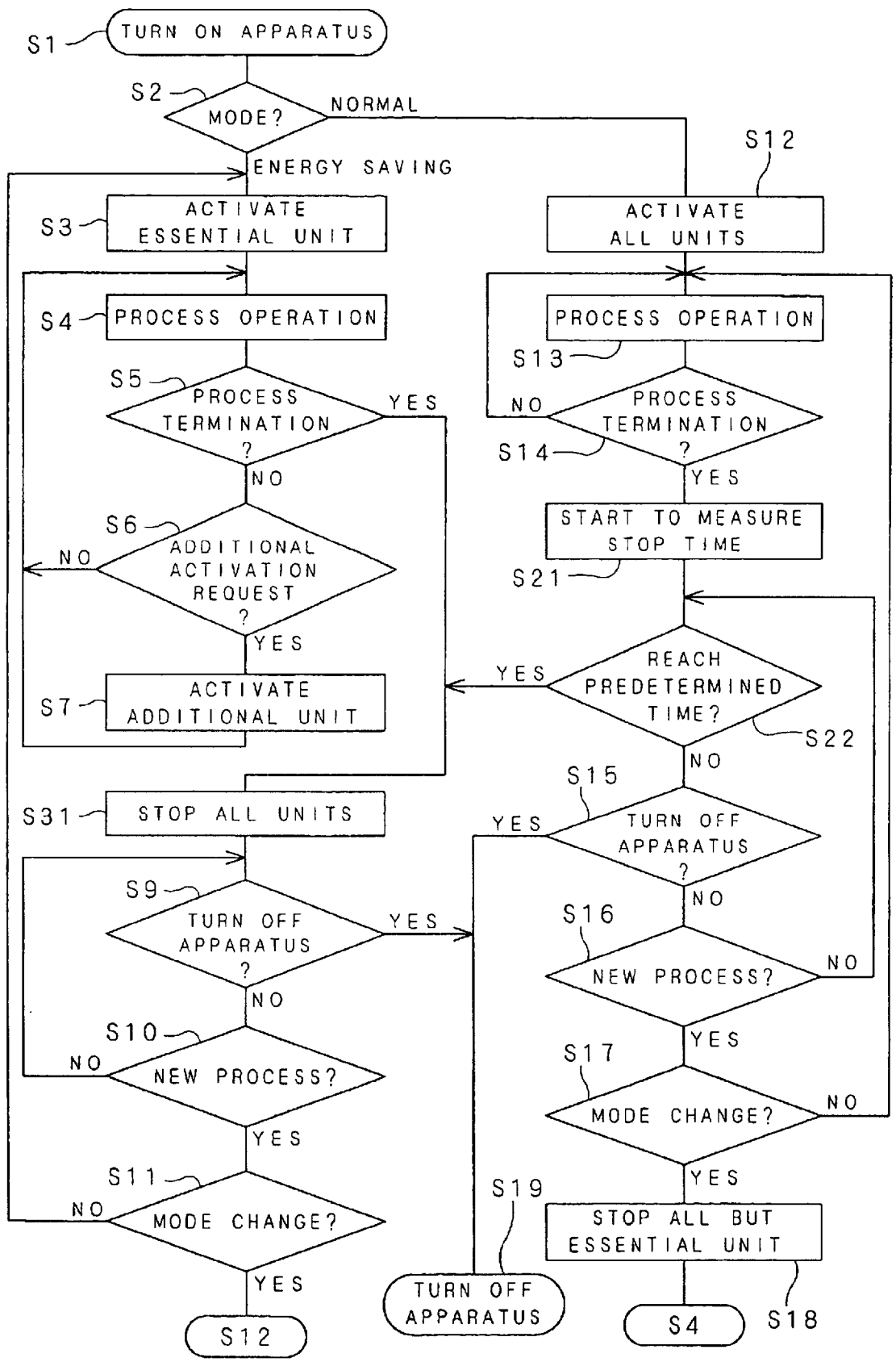
FIG. 7 is a diagram showing the flow of operation in a substrate processing apparatus according to a third preferred embodiment of the present invention.

FIG. 7 is the flow of operations in the substrate processing apparatus 1 according to the third preferred embodiment. The flow of FIG. 7 is the same as that of FIG. 6, except that instead of step S8, steps S31 is provided when the energy saving mode is selected, and that a point to which the program returns in the case of "NO" in step S11 is different. The operations other than operations irrelevant to these differences, such as the operations in the normal mode, are basically the same as that in the second preferred embodiment. Therefore, similar reference numerals are used and their description is omitted herein.

The third preferred embodiment is different from the first and second preferred embodiments in that, when the energy saving mode is selected in step 2, and thereafter a predetermined process is terminated ("YES" in step S3, step S4 and step S5), a general control means 21 issues an instruction to halt all the process units operating at that point (step S31). This enables to further reduce the power consumption in the wait state in the energy saving mode.

Thereafter, when a new process request occurs ("YES" in step S10), and the operation in the energy saving mode is continued without making any mode change ("NO" in step S11), there is no process unit operating at this point. Therefore, returning to step S3, the general control means 21 instructs the activation of essential units. A new process operation starts at the point of time that the essential units are brought into the usable state (step S3, step S4).

On the other hand, when the mode is changed so as to operate in the normal mode, returning to step S12, the general control means 21 instructs the activation of all the process units. A new process operation starts at the point of time that all the process units are brought into the usable state (step S12, step S13).

Thus, in the third preferred embodiment, all the process units including the essential units are halted in the wait state in the energy saving mode, thereby further suppressing power consumption than the first and second preferred embodiments.

Modifications

The type of process units constituting the substrate processing apparatus is not limited to the above-mentioned examples. There may be provided a variety of process units such as a process unit for forming anti-reflection coating, a unit for resist adhesion process, other indexer unit for transferring substrates with respect to an exposure device for forming circuit patterns, and an inspection unit for inspecting the resist film thickness and the formed circuit patterns. From these process units, an essential unit and additional unit may be selected and determined. The number of process units of the same type is also not limited to the above-mentioned examples. The effect of reducing power consumption, which is obtainable by the execution of processes only with essential units, increases as the number of units is increased and the apparatus has a larger size. The arrangement of process units is also not limited to the above-mentioned examples. Depending on the type and number of process units, they may be arranged so as to increase process efficiency.

Even when only one process unit is provided per processing step, the effect of the present invention can be obtained by using it as an essential unit.

Individual process units may be separately activated and halted by manual operation.

The setting of essential unit and additional unit may be changeable.

In the foregoing preferred embodiments, only the presence and absence of additional unit designation is determined. In an alternative, additional units may be set stepwise, and one or more additional units may be activated and halted, as needed. By doing so, power consumption can be adjusted more finely, taking process efficiency into account.

In the foregoing preferred embodiments, a process is started at the point of time that all the essential units are usable. In an alternative, the processing may be started at the point of time that a process unit in an early stage of a processing step is in the ready condition, and a process unit related to a process in a later stage may be activated so as to be in time for its process start time.

While the invention has been shown and described in detail, the foregoing description is in all aspects illustrative and not restrictive. It is therefore understood that numerous modifications and variations can be devised without departing from the scope of the invention.

What is claimed is:

1. A substrate processing apparatus comprising:
   (a) at least one processing part each having a plurality of processing elements, processing types of which are the same in each of said at least one processing part;
   (b) a control element for controlling the operation of said plurality of processing elements, wherein the activation and halt of said processing elements are controlled independently; and
   (c) a storage element for storing data related to operation conditions of said processing elements,
   said substrate processing apparatus being not only capable of executing a predetermined substrate processing with all of said plurality of processing elements but also capable of executing said predetermined substrate processing with only part of said plurality of processing elements.

2. The substrate processing apparatus according to claim 1 wherein
   said storage element stores information for specifying at least one first processing element among said plurality of processing elements, wherein said at least one first processing element is previously selected to be activated preferentially in said substrate processing apparatus.

3. The substrate processing apparatus according to claim 2 wherein
   said control element activates said at least one first processing element when no processing element has been activated for execution of said predetermined substrate processing.

4. The substrate processing apparatus according to claim 3 further comprising:
   (d) a selecting element for an operator to select an operation mode from a first mode and a second mode,
   wherein said first mode is an operation mode in which only said at least one first processing element among said plurality of processing elements is activated at the execution of said predetermined substrate processing,
   said second mode is an operation mode in which all processing elements are activated at the execution of said predetermined substrate processing, and
   said control element activates one or more processing elements in accordance with the operation mode selected.

5. The substrate processing apparatus according to claim 4 wherein
   said control element halts one or more objective processing elements having been used for said predetermined substrate processing after a predetermined time has elapsed since operation of said one or more objective processing elements for said predetermined substrate processing had completed.

6. The substrate processing apparatus according to claim 5 wherein
   said one or more objective processing elements are processing element(s) other than said at least one first processing element.

7. The substrate processing apparatus according to claim 6 wherein
   said storage element further stores information specifying at least one second processing element which is previously selected to be optionally activated, and
   said at least one second processing element is operable to be additionally activated to be used for said predetermined substrate processing when only said at least one first processing element is initially used for said predetermined substrate processing.

8. The substrate processing apparatus according to claim 7 wherein
   said control element halts processing elements other than said at least one first processing element at the termination of said predetermined substrate processing.

9. The substrate processing apparatus according to claim 7 wherein
   said control element halts all of said processing elements in response to termination of said predetermined substrate processing, and
   said at least one first processing element is activated again when a succeeding substrate processing is executed.

10. A method of operating a substrate processing apparatus provided with at least one processing part, said at least one processing part each having a plurality of processing elements, processing types of which are the same in each of said at least one of processing part and activation and halt of which are independently controllable, said method comprising the steps of:
    (a) storing condition data related to respective operation conditions of said plurality of processing elements;
    (b) determining whether or not all of said plurality of processing elements is required for a predetermined substrate processing requested; and
    (c) activating all of said plurality of processing elements or only part of said plurality of processing elements in accordance with the determination result of the step (b) to execute said predetermined substrate processing with reference to said condition data.

11. The method according to claim 10 wherein said step (a) comprises the step of (a-1) selecting at least one first processing element which is to be activated preferentially, and (a-2) storing information specifying said first processing element.

12. The method according to claim 11 wherein said step (c) comprises the step of (c-1) activating said at least one first processing element when no processing element has been activated for execution of said predetermined substrate processing.

13. The method according to claim 12 wherein said step (b) comprises the step of (d-1) determining an operation mode in response to selection by an operator from a first mode and a second mode, wherein said first mode is an operation mode in which only said at least one first processing element among said plurality of processing elements is activated at the execution of said predetermined substrate processing, said second mode is an operation mode in which all processing elements are activated at the execution of said predetermined substrate processing, and said step (c-1) comprises the step of activating one or more processing elements in accordance with the operation mode selected.

14. The method according to claim 13 further comprising the step of:

(d) halting said one or more objective processing elements having been used for said predetermined substrate processing after a predetermined time has elapsed since operation of said one or more objective processing elements for said predetermined substrate processing had completed.

15. The method according to claim 14 wherein said one or more objective processing elements are processing element(s) other than said at least one first processing element.

16. The method according to claim 15 wherein said step (a) further comprises the step of:

(a-3) storing information specifying at least one second processing element which is previously selected to be optionally activated, and said step (b) further comprises the step of:

(b-2) additionally activating said at least one second processing element for said predetermined substrate processing when only said at least one first processing element is initially used for said predetermined substrate processing.

17. The method according to claim 16 wherein said step (d) includes the step of:

(d-1) halting processing elements other than said first processing element at the termination of said predetermined substrate processing.

18. The method according to claim 16 wherein said step (d) includes the steps of:

(d-2) halting all of said processing elements in response to termination of said predetermined substrate processing, the method further comprising the step of:

(e) activating said at least one first processing element again when a succeeding substrate processing is executed.

19. A program which is installable in a computer provided in a substrate processing apparatus, wherein execution of said program by said computer makes said substrate processing apparatus operate as a multi-mode substrate processing apparatus comprising:

(a) at least one processing part each having a plurality of processing elements, processing types of which are the same in each of said at least one processing part;

(b) a control element for controlling the operation of said plurality of processing elements, wherein activation and halt of said processing elements are controlled independently; and (c) a storage element for storing data related to operation conditions of said processing elements, wherein said multi-mode substrate processing apparatus is not only capable of executing a predetermined substrate processing with all of said plurality of processing elements but also capable of executing said predetermined substrate processing with only part of said plurality of processing elements.

* * * * *